INVENTOR:
Jaroslav MRKVIČKA
by: Arthur O. Klein, his Attorney

INVENTOR:
Jaroslav MRKVIČKA
BY: Arthur O. Klein
his Attorney

ERROR CHECKING CIRCUIT FOR DIGITALLY CONTROLLED PRINTERS

Filed May 16, 1968

INVENTOR:
Jaroslav MRKVIČKA
BY: Arthur O. Klein
his Attorney

United States Patent Office 3,560,926
Patented Feb. 2, 1971

3,560,926
ERROR CHECKING CIRCUIT FOR DIGITALLY CONTROLLED PRINTERS

Jaroslav Mrkvicka, Prague, Czechoslovakia, assignor to Vyzkumny ustav matematickych stroju, Prague, Czechoslovakia, a corporation
Filed May 16, 1968, Ser. No. 729,825
Claims priority, application Czechoslovakia May 15, 1967, Ser. No. 3,511/67
Int. Cl. G06f *11/00*
U.S. Cl. 340—146.1 5 Claims

ABSTRACT OF THE DISCLOSURE

A checking circuit is arranged to detect malfunctions in the output portion of a digitally controlled printer whose incoming digital control information is in the form of successive first frames having N time slots each. The first frames are converted to N parallel paths selectively containing command bits for N solenoid-actuated hammers in the printer. A parallel pulse pattern corresponding to those of the hammer solenoids actually excited is converted to serial form as successive second frames. The latter are compared with the first frames in an anticoincidence gate, and successive second frames are compared (after a relative delay of N time slots) in a coincidence gate. The outputs from anticoincidence and coincidence gates are respectively indicative of imperfect operation of the hammer actuating power supply and of erroneous double printing.

BACKGROUND OF THE INVENTION

In a typical digitally controlled printer, coded and stored input information that is initially in serial form (for example, that defines successive first frames of N time slots each) are converted to N parallel command bits bearing information equivalent to that carried in serial form at the input. The parallel bits individually excite N solenoid-actuated printing hammers, which press pressure-sensitive paper or tape against a rotating, suitably embossed drum define a row of characters corresponding to the input coded information.

Error checking circuits are commonly used in the input portions of such printers to assure accurate transfer of control data to the individual power supplies of the hammer solenoids. Such checking circuits, however, are not generally effective to detect errors (which may be of diverse types) associated with the output portions of the printers, for example, errors manifested as malfunctions in the actuation of the solenoids. These latter errors, which indicate a lack of correspondence between the actual pattern of hammers actuated and the pattern of command bits applied to the input of the solenoid power supplies, may be caused by (a) the failure of one or more of the power supplies to excite the associated solenoids in response to command bits of the proper state, or (b) to multiple actuation of the hammers, which may result in erroneous double printing.

While checking circuits associated with the output portions of line printers are not unknown, such circuits can generally handle only a single type of error.

SUMMARY OF THE INVENTION

The present invention provides a checking arrangement which can detect diverse types of errors associated with the output portion of a digitally controlled printer. In a preferred embodiment, an auxiliary pulse is generated by each hammer power supply upon the excitation of each hammer solenoid so that a pattern of pulses corresponding to the actual output condition of the several hammer solenoids is generated. Such pattern will ideally coincide with the parallel pattern of N command bits applied to the inputs of the hammer power supplies, but will deviate therefrom in case of an error in the printing output. The output pulse pattern is converted into serial form, i.e., into successive second frames each having the same number of time slots (N) as those associated with the first frames of the incoming coded information.

The first frames of the incoming serial information are stored in a suitable memory device. The generated second frames and the stored first frames, which are brought into registration on the time domain by suitable means, are applied to separate inputs of an anticoincidence circuit. In addition, each second frame, suitably delayed by an integral number of frame periods, is compared with a succeeding second frame in a coincidence circuit. The presence of an output on the anticoincidence circuit is indicative of the failure of at least one power supply to properly excite the associated hammer solenoid, while the presence of an output on the coincidence circuit is indicative of erroneous double printing.

BRIEF DESCRIPTION OF THE DRAWING

The nature of the invention and its advantages will appear more fully from the following detailed description taken in conjunction with the appended drawing, in which.

DETAILED DESCRIPTION

Figure 1:
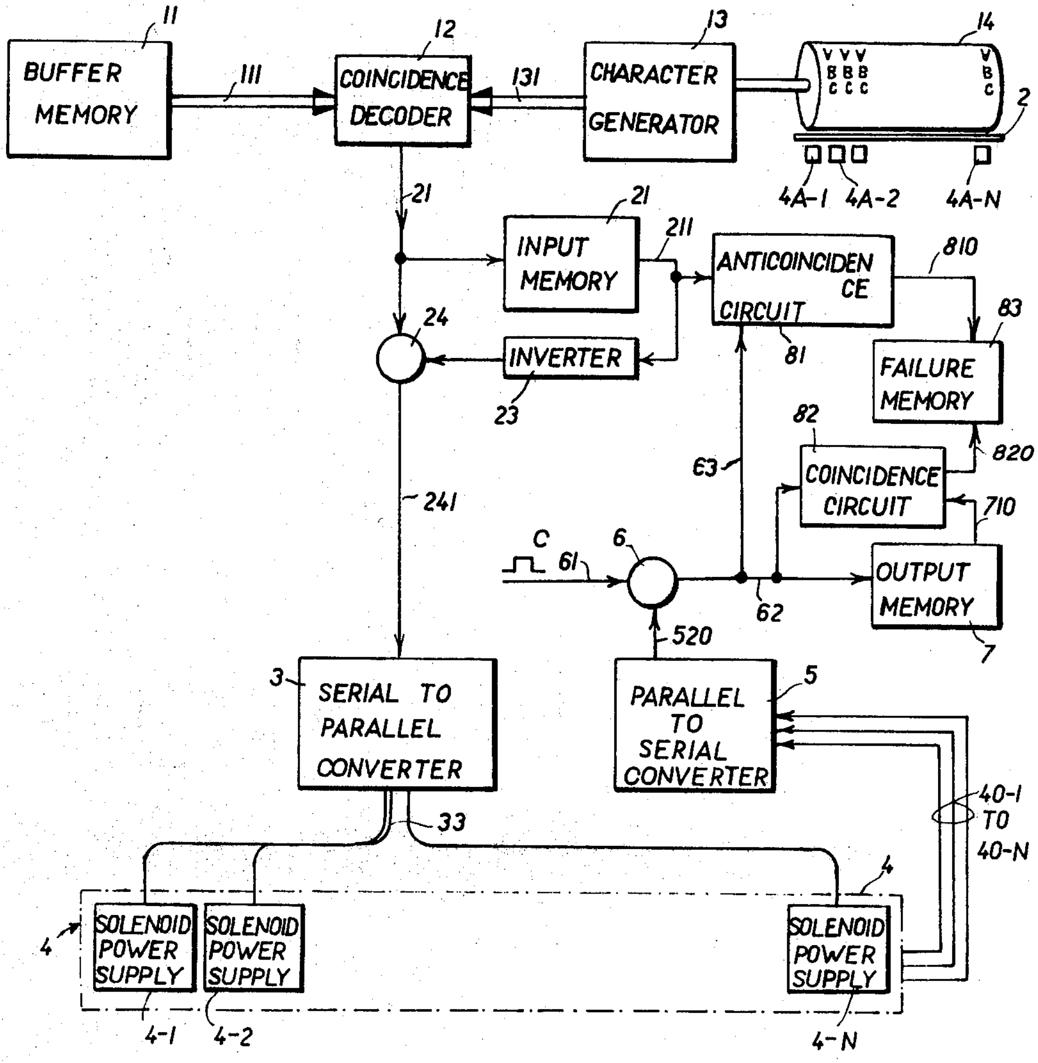
FIG. 1 is a block and schematic diagram of a digitally controlled printer having an error checking circuit in accordance with the invention.

Referring to the drawing, FIG. 1 shows an overall arrangement of detecting diverse types of errors in the printing of a line of N characters (not shown) on a moving, pressure-sensitive web 2. The printing is accomplished with the use of N solenoid-actuated printing hammer's **4*a*–1, 4*a*–2 . . . 4*a*–N, which selectively press the web 2** against the periphery of a suitably embossed rotating drum 14. The line of characters is imprinted on the web 2 by simultaneously exciting N individual solenoid power supplies 4–1, 4–2 . . . 4–N. The N power supplies 4 are individually supplied in parallel with N command bits (not shown) from the output of a serial-to-parallel converters 3 over a plurality of leads 33. A predetermined state of each command bit, i.e., a binary "1," applied to the associated one of the power supplies 4 will actuate the hammer 4a associated therewith to imprint a character on the then-opposite of the web. 2. The individual states of the command bits, in turn, are regulated by incoming information stored in a buffer memory 11 and serially applied to the input of the converter 3 over a line 241, as described below.

The encoded printing information in the memory 11 is applied, via a line 111, to a coincidence decoder 12. At the same time a character pulse code is out-pulsed on a line 131 from a suitable pattern generator 13 disposed on the axis of the rotating drum 14; each character on the drum is represented by a unique character pulse code in the generator 13. The decoder 12 compares the encoded data characters applied thereto from the buffer 11 in bit-by-bit fashion with the code corresponding to the character then in registration with the printing position of drum 14. As the drum rotates, the codes representing the subcessive characters on the drum are compared with the incoming information from the buffer 11. Upon coincidence of each bit of data on the lines 111 and 131, a binary "1" bit is out-pulsed from the decoder 12 over the line 121 to one input of a gate 24. It will be assumed that each binary bit is a pulse of length T, and that each set of coded information entering the decoder from the buffer 11 and the generator 13 occurs within a first frame of N successive time slots each having the binary bit interval T. The incoming information from the buffer 11 is suitably synchronized with the rotation of the drum 14 such that the bits appearing in successive ones of the N time slots in each first frame generate, in the manner indicated below, command bits for corresponding ones of the successive printing hammer power supplies 4–1, 4–2 . . . 4–N. For example, if the data bit from the buffer 11 appearing in the second time slot of a given first frame coincides with the corresponding date bit in the character code then outpulsed by the generator 13, a binary "1" will be out-pulsed from the decoder 12 over the line 121. If the gate 24 is open, the binary "1," after conversion in the converter 3, will energize the solenoid power supply 4–2, and thereby actuate the corresponding printing hammer 4a–2. In all other cases, a binary "0" will be out-pulsed from the decoder 12 and applied through the gate 24 and the converter 3 to the associated power supply 4, which will not be energized.

It is seen, therefore, that the input to the gate 24 from the decoder 12 will be a succession of first frames each having N successive time slots individually corresponding to the N hammers 4a. Each binary bit at the input of the gate 24 will occupy a single time slot of length T. In order to prevent more than one such binary bit from appearing in the same time slot, the output data from the decoder 12 is also registered in an input memory 21 whose output is applied through an inverter 23 to a second input of the gate 24. With this arrangement, once the registration of each bit in the memory has taken place, the gate 24 will be rendered nonconductive upon the occurrence of a subsequent binary bit in the same time slot.

Further details of the arrangement and operation of printer input circuitry similar to the buffer 11, the pattern generator 13, the coincidence decoder 12, and the input memory 21 may be found, for example, in U.S. Pat. No. 3,140,470, issued to A. J. Deerfield on July 7, 1964, and in U.S. Pat. No. 3,222,651 issued to E.S. Fabiszweski et al. on Dec. 7, 1965.

Figure 2:
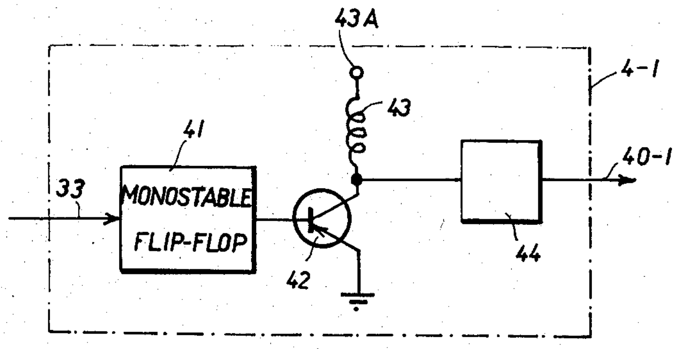
FIG. 2 is a block and schematic diagram of one form of printing hammer power supply suitable for use in the checker of FIG. 1.

Assuming again that inhibition of the gate 24 does not occur, the successive first frames of N bits each are applied over the line 241 to the serial-to-parallel converter 3 whose construction is described below. As indicated before, the converter 31 converts the binary bits occurring in the N time slots of each first frame to the N parallel command bits for the power supplies 4. Assuming that each power supply (illustratively the supply 4–1) takes the form shown in FIG. 2, each command bit outpulsed over the output lead 33 triggers a monostable flip-flop 41 to close a transistor switch 42 for a prescribed interval. The switch completes a path from a voltage source 43a to ground for a solenoid coil 43 that actuates the printing hammer 4a–1 (FIG. 1). The closing of the switch 42 (FIG. 2) also energizes a path to ground for a suitable resistance divider 44 through the source 43a and the solenoid 43 to provide, on an output lead 40–1, a monitoring pulse that is coincident and coextensive with the excitation pulse applied to the solenoid. In like manner, all of the power supplies 4 (FIG. 1) yield individual output monitoring pulses over corresponding output leads 40 upon the energizing of the associated solenoids (not shown). The output pulse pattern occurring on the lines 40 when the printing solenoids are actuated in response to each application of the N command bits to the power supplies 4 is ideally coincident with the bit pattern of such command pulses.

Each output pulse pattern on the lines 40 is applied to a parallel-to-serial converter 5, which may be the complement of the converter 3. As indicated below, the resulting serial output of the converter 5 is in the form of successive second frames having N time slots of duration T each. The second frames are applied to the input of a gate 6 over a line 520. The gate 6 is enabled by means of pulses C, whose duration is equivalent to the length of each second frame, for example, NT. The pulses C are applied to the gate 6 over a line 61 from a source (not shown). The output of the gate 6 is applide to each of the line 62 and 63. The line 63 is coupled to the input of an anti-coincidence circuit of the type shown, for example, in U.S. Pat. No. 2,789,267 issued to D. H. Beal et al. on Apr. 16, 1957. The other input to the anticoincidence circuit 81 is the information contained in the successive first frames from the coincidence decoder 12, as registered in the input memory 21. The registered first frames are applied to the anticoincidence circuit 81 from the memory 21 over an output lead 211. The output of the circuit 81 appears on a line 810.

The line 62 is coupled to an output memory 7 having a capacity at least equal to the N time slots occupied by each of the first and second frames. The memory 7 is preferably arranged as a buffer having a delay equal to the length of a second frame. The output of the memory 7 is applied, via a line 710, to one input of a conventional coincidence circuit 82. The other input of the circuit 82 is the output of the gate 6 via the line 62. The output of the circuit 82 appears on a line 820.

The anticoincidence circuit 81 effects a comparison between the first frames which represent the original serially coded information for controlling the output portion of the printer and the second frames, which represent in serial form, the actual output pulse pattern applied to the hammers 4a. Thus, the presence of an output on the lead 810 is indicative of the failure of the power supplies 4 to energize the associated solenoids in exact correspondence with the information in the applied command bits. In like manner, it will be seen that the coincidence circuit 82 compares each second frame with a succeeding second frame; such successive frames are brought into time registration as a result of the delay of N time slots supplied by the memory 7. Thus, the presence of an output signal on the lead 820 is indicative of the presence of multiple actuating signals from the power supply 4 to one or more of the hammers 4a, which multiple signals may result in multiple printing of certain characters on successive lines of the readout. In short, by comparing the first and second frames in an anticoincidence circuit and also comparing successive second frames in a coincidence circut, separate classes of errors appearing on the output portion of a digitally controlled printer may be checked.

As shown, the presence of such errors may be registered in a suitable memory 83 coupled to the output lines 810 and 820.

Figure 3:
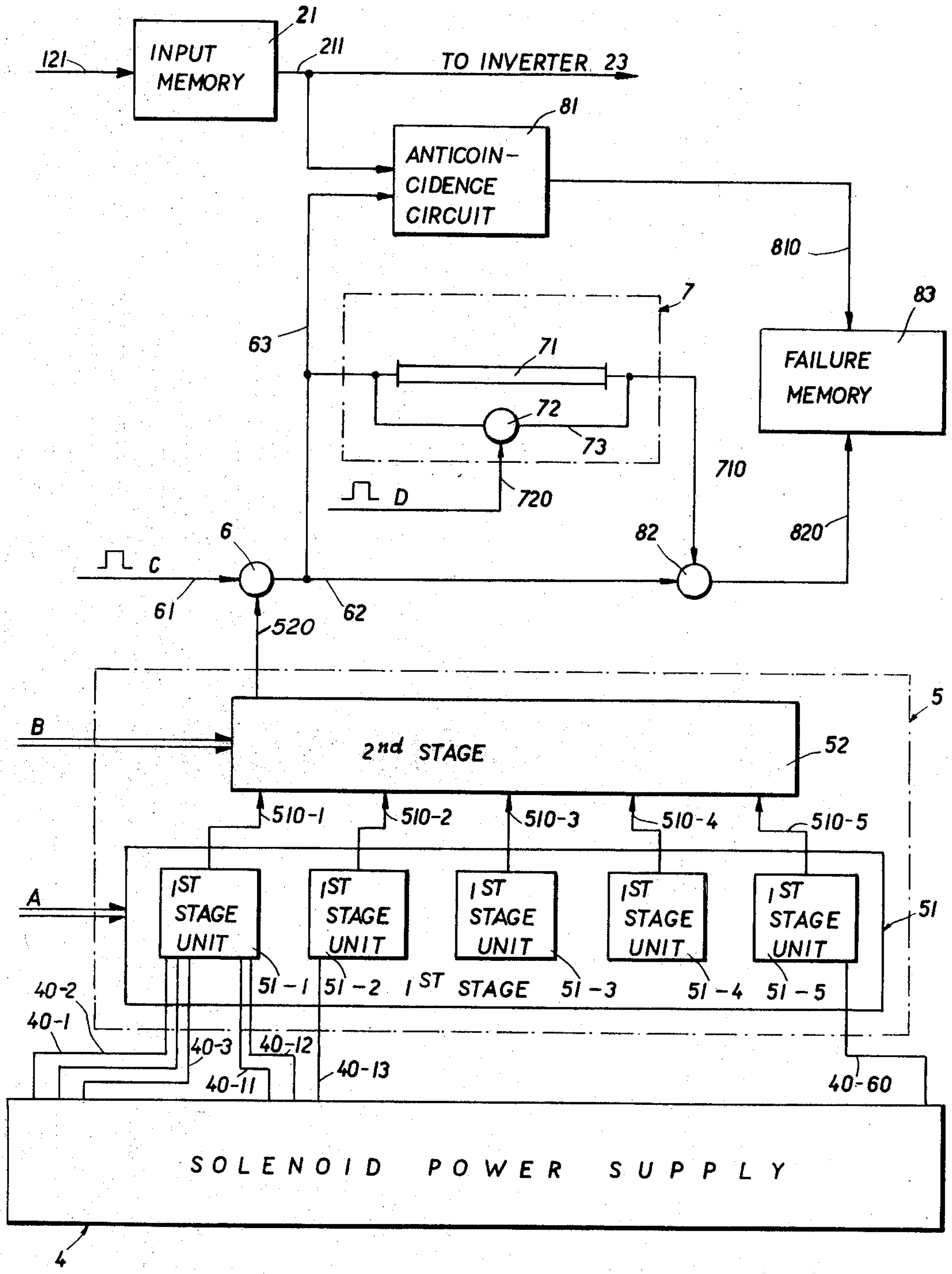
FIG. 3 is a block and schematic diagram illustrating certain details of a parallel-to-serial converter and of the error checking circuit of FIG. 1.

As shown best in FIG. 3, the output memory 7 may include a delay line 71 coupled to the output line 63 of the gate 6, and a feedback path 73 extending from the output to the input of the delay line 71. The feedback path 73 includes a gate 72 which is selectively enabled for intervals equal to an integral number of frame lengths by means of enabling pulses D, which are applied thereto over a lead 720 from a suitable generator (not shown). Another example of a suitable buffer circuit which may be used to delay a series of pulse signals is described in U.S. Pat. No. 2,629,827, issued to J. P. Eckert, Jr., et al., on Feb. 24, 1953.

One illustrative embodiment of the parallel-to-serial converter 5 (and, by analogy, the serial-to-parallel converter 3) is shown in FIGS. 3–7. In FIG. 3, for example, it is seen that the converter 5 generally includes a first stage 51 and a second stage 52. The first stage 51 includes five identical units 51–1 to 51–5, each of which is coupled to a separate $N/5$ (illustratively 12, when N=60) ones of the parallel output monitoring lines 40 from the power supply 4. The units 51, which function as parallel-to-serial converters for their input lines, are enabled in the manner described below by suitable pulses A so that the parallel pattern of pulses on the N input lines 40 are converted to $N/12$ auxiliary frames each having $N/5$ time slots. The $N/12$ auxiliary frames respectively appear on individual output leads 510–1 to 510–5. The second stage 52 received the $N/12$ auxiliary frames respectively appearing on the outputs 510 and, with the aid of pulses 8, converts these auxiliary frames to a succession of composite second frames each having N time slots. The second frames, which appear on the lead 520, are applied to the input of the gate 6 for processing as described above.

Figures 4, 5:
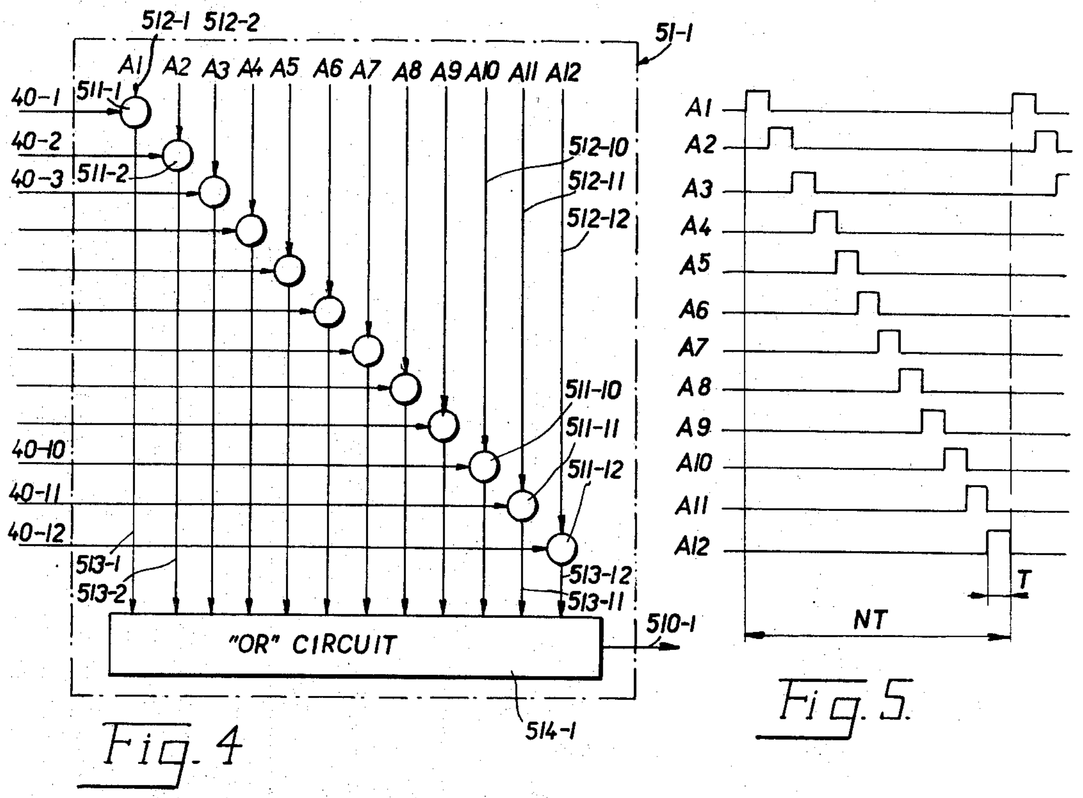
FIG. 4 is a block and schematic diagram of the input stages of a parallel-to-serial converter suitable for use in the arrangement of FIG. 3.
FIG. 5 is a set of waveform diagrams illustrating enabling pulses for the input stages of FIG. 4.

A pictorial diagram of a typical one of the units 51–1, 51–2 . . . 51–N in the first stage of the converter 5 is shown in FIG. 4. Each unit 51 (illustratively 51–1) includes $N/5$ gates 511–1, 511–2, . . . 511–12, one set of inputs of which are coupled to the solenoid pulse output leads 40. The other inputs of the gated 511 are individually coupled to a plurality of successive pulses A1–A12, each of which has a length T (FIG. 7) and a period $NT/5$. The pulses A selectively enable the associated gates 511 to convert the information on the parallel output leads 40 to a succession of pulses appearing on a plurality of output lines 513–1, 513–2 . . . 513–12 of the gates 511. The output lines 513 are all coupled to a common OR circuit 514–1. The latter acts as a buffer so that the output of the OR circuit 514–1 appearing on the lead 510–1 is a succession of auxiliary frames having $N/5$ time slots each. Each of the time slots in an auxiliary frame represents the information appearing in an associated one of the parallel outputs applied thereto over the leads 513. It will be understood that the auxiliary frames of $N/5$ time slots represented by the serial outputs on the leads 510–1, 510–2 . . . 510–5 (FIG. 3) are indicative of the information on the separate groups of $N/5$ output lines 40 from the power supply 4.

Figures 6, 7:
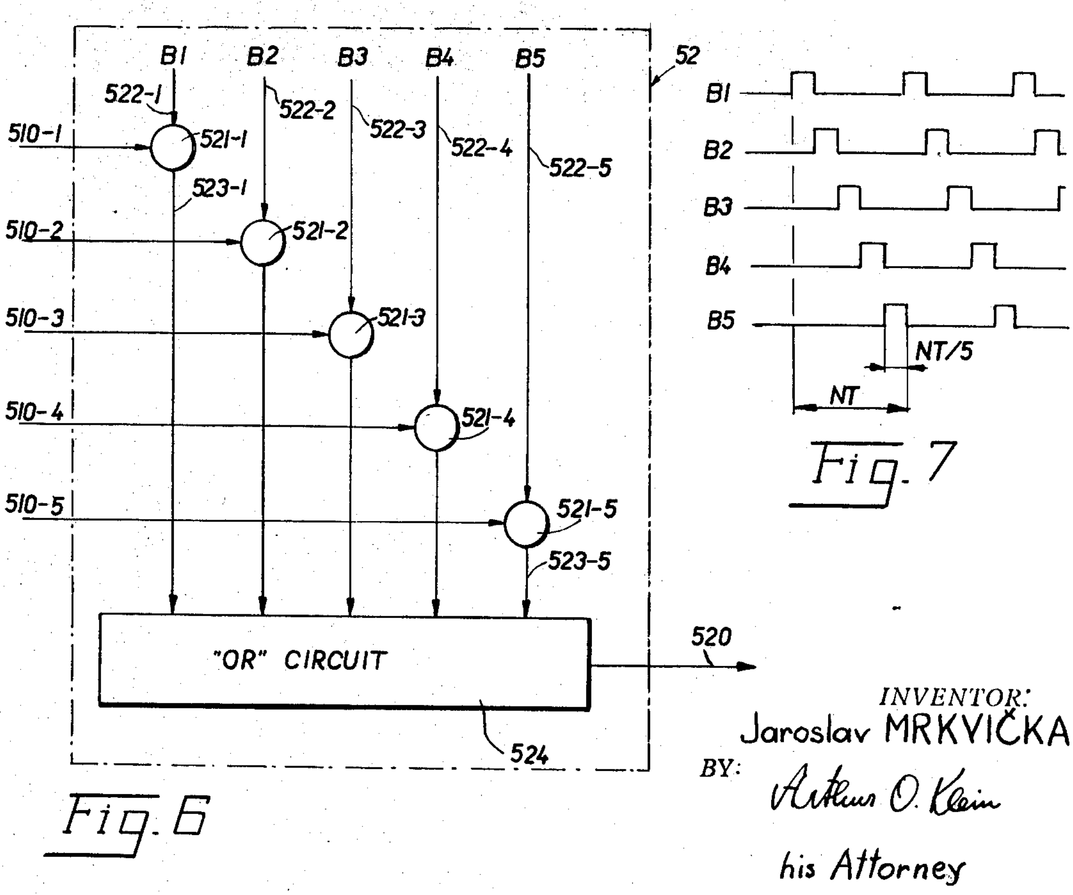
FIG. 6 is a block and schematic diagram of the output stages of a parallel-to-serial converter suitable for use with the arrangement of FIG. 3.
FIG. 7 is a set of waveform diagrams illustrating enabling pulses for the output stages of FIG. 6.

The operation of the second stage 52 (FIG. 6) of the parallel-to-serial converter 5 is similar to that of the input stage 51 (FIG. 5). The auxiliary frames of $N/5$ time slots appearing on the leads 510–1, 510–2 . . . 510–5 are applied to one set of inputs of a corresponding plurality of gates 521–1, 521–2 . . . 521–5 (FIG. 6). The other inputs of gates 521 are individually coupled to a plurality of successive pulses B1–B5, each of which has a duration $NT/5$ (FIG. 7) and a period NT. The application of the pulse B1 (FIG. 6) to the gate 521–1, for example, gates an entire auxiliary frame of $T/5$ time slots on the lead 510–1 to an input of a second OR circuit 524 over an output lead 523–1. Similarly, the pulses B2–B5 enable the other gates 521–2, 521–3 . . . 521–5 over their associated frame lengths of $T/5$ time slots to gate such frames to the OR circuit 524 via the lines 510–2, 510–3 . . . 510–5. The OR circuit 524 acts as a buffer to combine the $N/12$ auxiliary frames into the composite second frame having N time slots and a total length NT.

In the foregoing, the invention was described in connection with a preferred embodiment thereof. Many other variations and modifications will now become obvious to those skilled in the art. It is accordingly desired that the breadth of the claims not be limited to the specific disclosure herein contained.

What is claimed is:

1. Apparatus for detecting diverse types of errors in the printing of a line of N characters in response to input information signals appearing serially in N time slots within the first frame, the printing being accomplished by N printing devices individually responsive to N parallel command bits derived from the information signals in the N successive time slots in each first frame, which comprises:
   - parallel-serial conversion means coupled to the output of the printing devices and rendered effective upon each operation of the printing devices for serially generating a second frame of output information signals appearing in N successive time slots, the information in the $K_{th}$ time slot ($O \lesseqgtr K \lesseqgtr N$) in the second frame ideally corresponding to that of the $K_{th}$ command bit;
   - means for storing each first frame and outpulsing each stored first frame in serial form;
   - an anticoincidence circuit having first and second inputs; and
   - means for individually coupling the serial outputs of the conversion means and the first frame storing means to the respective inputs of the anticoincidence circuit, the presence of an output from the anticoincidence circuit being indicative of a lack of correspondence between the information contained in a first frame and the information represented by the line of characters printed in response to the N command bits corresponding to that first frame.

2. Apparatus for detecting diverse types of errors in the printing of a line of N characters in response to input information signals appearing in N time slots within a first frame, the printing being accomplished by N printing devices individually responsive to N parallel command bits derived from the information signals in the N successive time slots in each first frame, which comprises:
   - means rendered effective upon each operation of the printing devices for generating a second frame of output information signals appearing in N successive time slots, the information in the $K_{th}$ time slot ($O \lesseqgtr K \lesseqgtr N$) in the second frame ideally corresponding to that of the $K_{th}$ command bit;
     - means for storing each first frame;
     - buffer means having a delay of at least N time slots;
     - a coincidence circuit having first and second inputs;
     - an anticoincidence circuit having first and second inputs;
   - first means for individually coupling the output of the generating means and the output of the first frame storing means to the respective inputs of the anticoincidence circuit, the presence of an output from the anticoincidence circuit being indicative of a lack of correspondence between the information contained in a first frame and the information represented by the line of characters printed in response to the N command pulses corresponding to that first frame;
   - second means for coupling the output of the generating means to the input of the buffer means; and
   - third means for individually coupling the output of the generating means and the output of the buffer means to the respective inputs of the coincidence circuit, the presence of an output from the coincidence circuit being indicative of the accidental multiple printing of the same line of characters by the printing devices.

3. Apparatus as defined in claim 2, further comprising:
gating means interposed between the output of the generating means and the respective inputs of the anticoincidence circuit, the coincidence circuit, and the buffer means; and
means for selectively enabling the interposed gate over intervals corresponding to the capacity of the buffer means.

4. Apparatus as defined in claim 2, in which each printing device comprises:
a solenoid;
a pulse power supply responsive to the associated one of the command bits for energizing the solenoid; and
means for generating an output monitoring pulse upon the energizing of the solenoid.

5. Apparatus as defined in claim 4, further comprising:
means for coupling the output monitoring pulses of all of the printing devices in parallel to the input of the second frame generating means.

References Cited

UNITED STATES PATENTS

| | | | |
|---|---|---|---|
| 2,978,977 | 4/1961 | Eckert, Jr. | 340—146.1 X |
| 3,066,601 | 12/1962 | Eden | 340—146.1 X |
| 3,222,651 | 12/1965 | Fabiszewski | 340—146.1 X |
| 3,248,692 | 4/1966 | Shih | 340—146.1 |

EUGENE G. BUTZ, Primary Examiner

C. E. ATKINSON, Assistant Examiner

U.S. Cl. X.R.

235—153; 101—93